United States Patent Office 3,413,543
Patented Nov. 26, 1968

3,413,543
COMPENSATED FERROELECTRIC HYSTERESI-
SCOPE EMPLOYING GROUND REFERENCE
Norman W. Schubring, Birmingham, Alexander Meduv-
sky and James P. Nolta, Warren, and Ronald A. Dork,
Utica, Mich., assignors to General Motors Corporation,
Detroit, Mich., a corporation of Delaware
Filed Apr. 23, 1965, Ser. No. 450,484
6 Claims. (Cl. 324—61)

ABSTRACT OF THE DISCLOSURE

A simple compensable ferroelectric hysteresiscope permitting measurement of a ground referenced sample voltage by means of an oscilloscope.

Summary of the invention

Figure 1:
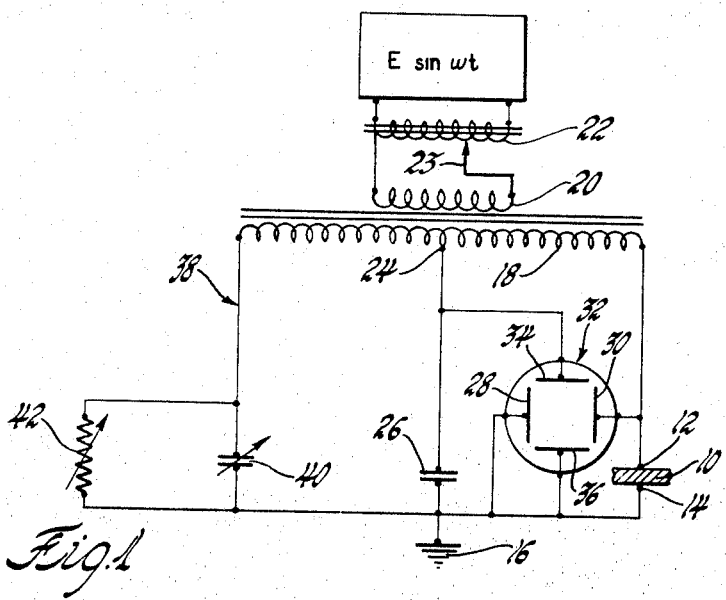

This invention relates to ferroelectric hysteresis portraiture techniques and more particularly to a method and apparatus for obtaining information regarding the hysteresis characteristic of a ferroelectric sample wherein the sample may be grounded during the measurement.

Ferroelectric materials may be distinguished from ordinary dielectrics on the basis of the hysteresis type behavior of the ferroelectrics when subjected to a time varying electric field. In a ferroelectric material the change in charge across a ferroelectric material lags the corresponding change in the applied field by a degree which is dependent both upon the applied field itself and the past history of the ferroelectric sample. Further, a residual effect remains after the electric field is removed. This hysteretic quality is suggestive of a "memory" thus contributing to the utility of ferroelectric materials in a number of commercial applications.

To make effective application of the hysteresis characteristic of a ferroelectric material, it is necessary to know in advance of application the characteristics of the material to a high degree of accuracy. It is for this purpose that hysteresiscopes are employed. Hysteresiscopes in general display the hysteresis portraiture of a ferroelectric sample by generating a cyclic plot of charge versus potential where both quantities are instantaneous values of time varying cyclic functions and are in general observed on an oscilloscope. In one well-known hysteresiscope a time varying current is conducted through the series combination of the ferroelectric sample and an integrating capacitor which is used to provide a voltage which is proportional to the time integral of current to the sample. This voltage is thus indicative of the charge across the sample and may be applied to the vertical axis of an oscilloscope. Another voltage produced across the sample may be applied to the other axis of the oscilloscope to produce a representation of the hysteresis loop of the sample. In this well-known circuit the ferroelectric capacitive sample must be floated above ground potential. This necessarily precludes the possibility of employing auxiliary or ancillary control apparatus in connection with the ferroelectric sample where such apparatus must be referenced to ground through the ferroelectric sample. In addition, a compromise value for the integrating capacitor must be selected since, on one hand, the capacitor should be small such that the impedance thereof will be substantial enough to generate a significant voltage representing charge and, on the other hand, the capacitor should be very large for the sake of generating an accurately measurable voltage across the sample.

A primary object of the invention is to provide a method for determining the hysteresis characteristic of a ferroelectric sample. This method comprises the steps of inducing a cyclic current flow through the ferroelectric sample to ground, developing a pair of signals corresponding to the cyclic voltage variations across the sample with respect to ground and the time integral of current through the sample, respectively, and coordinating the signals to represent the hysteresis characteristic of the sample.

In accordance with the present invention, a ferroelectric hysteresiscope is provided in which the sample may be grounded. This is accomplished through a circuit wherein one side of a ferroelectric sample may be connected through the series combination of a source of time varying current and a current integrating means such as a capacitor to a point of reference potential such as ground, and the other side of the ferroelectric sample may also be connected to ground. Since the time varying current passes through both the ferroelectric sample and the integrating means in the same series circuit, the signals across each are produced by the same current and are both referenced to ground. The integrating means provides a first voltage which is proportional to the time integral of current through the sample and may be used as one input to a readout means such as an oscilloscope which provides a coordinated representation of two voltages applied thereto. The other input to the readout means may be taken directly across the ferroelectric sample. Since both the sample and the integrating means are referenced to ground, the readout means may also be conveniently referenced to ground thus referencing both voltages to the same potential.

In a preferred form the inventive circuit may employ current input means including a transformer having a primary winding connected to a source of time varying current and a secondary winding having two terminal ends and connected on one end to the ferroelectric sample and through the sample to ground and on the other end through the integrating means to ground.

In a still further form of the invention, a compensation circuit may be incorporated into the basic grounded sample circuit for measuring the linear capacitance and resistance of the ferroelectric sample. The compensation circuit may include a linear resistor or capacitor or a combination thereof connected to receive a time varying current flow. The compensation circuit may be connected across the integrating means of the basic circuit. By this compensation technique, the opening and slope characteristics of the hysteresis curve produced by linear resistance and capacitance, respectively, of the sample may be varied by varying the quantity of linear resistance and capacitance introduced into the circuit through the compensation means.

Figure 2:
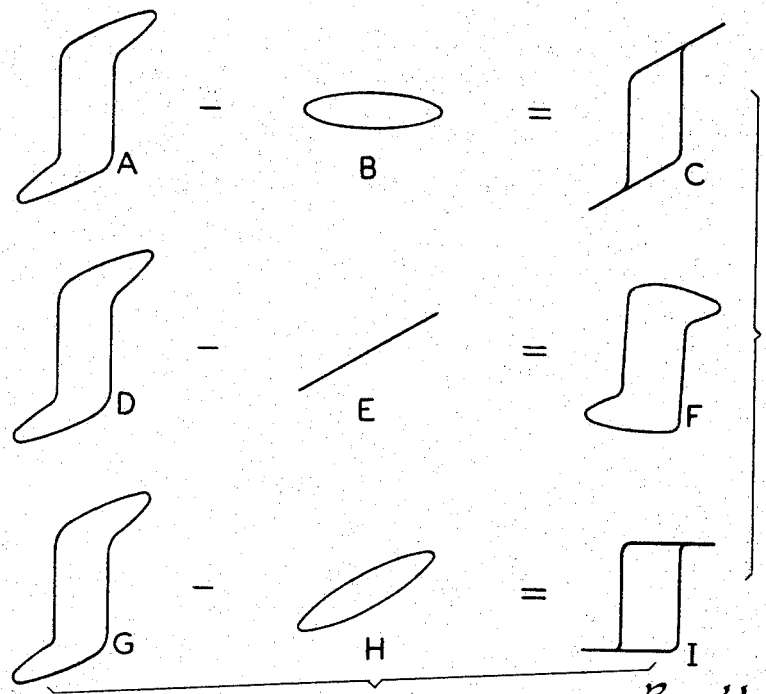

The invention may be best understood by a reading of the following description of a specific embodiment thereof taken with the accompanying figures of which:

FIGURE 1 is a schematic circuit diagram of a specific embodiment of the invention illustrating the grounded sample feature and a compensation loop; and FIGURE 2 is an illustration of the effects of the addition of resistive and capacitive impedance compensation on the hysteresis loops produced by the circuit shown in FIGURE 1.

Referring to FIGURE 1 there is shown a circuit for measuring and displaying the hysteresis characteristics of a ferroelectric sample 10. The sample 10 may be connected into the circuit across a pair of input terminals 12 and 14. Terminal 14 is connected to a point 16 of reference potential shown in FIGURE 1 as ground. Terminal 12 is connected to the right-hand terminal end of a center tapped transformer secondary winding 18. A time varying voltage signal is produced across winding 18. This time varying signal is inductively coupled into the secondary winding 18 from a primary winding 20. The primary winding 20 is in turn inductively coupled in the manner of an autotransformer to the portion of a winding 22 as determined by the position of an adjustable tap 23. The time varying voltage is preferably a sinusoidal voltage of the form E sin ωt as indentified in FIGURE 1. This produces a corresponding sinusoidal waveform in the secondary winding 18 which may be adjusted in magnitude in accordance with the position of the tap 23.

To complete a current carrying path through the sample 10, a center tap 24 of secondary winding 18 is connected through an integrating capacitor 26 to grounded point 16. Thus it can be seen that a continuous series path is defined from terminal 12 through the right-hand portion of secondary winding 18, as shown in FIGURE 1, the integrating capacitor 26, and the grounded point 16 to the other input terminal 14. As is apparent from FIGURE 1, one side of both the ferroelectric sample 10 and the integrating capacitor 26 are referenced to the ground point 16.

Upon energization of the secondary winding 18, a time varying current is produced in the circuit defined by integrating capacitor 26, the right-hand side of secondary winding 18, and the ferroelectric sample 10. Accordingly a voltage is developed across input terminals 12 and 14 which corresponds to the voltage across the sample 10. This voltage in turn corresponds to the electric field impressed across the ferroelectric sample 10. This voltage identified in FIGURE 1 as $V_X$ is applied to the X axis deflection plates 28 and 30 of an oscilloscope 32. A second voltage identified in FIGURE 1 as $V_Y$ is produced across the integrating capacitor 26 which corresponds to the time integral of current in the circuit passing through both integrating capacitor 26 and the sample 10. This signal accordingly represents the charge through the ferroelectric sample 10 and is applied to the Y axis deflection plates 34 and 36 of the oscilloscope 32.

The oscilloscope, receiving voltages on the X and Y axes deflection plates, respectively, corresponding to the electric field across the sample 10 and the time integral of current through the sample, presents a coordinated representation of these signals. This coordinated representation appears as a hysteresis loop of the character shown in FIGURES 2A, D and G. As shown in FIGURE 1, both the X and Y axes of the oscilloscope 32 are referenced to ground through the deflection plates 28 and 36, respectively. The oscilloscope 32 is chosen to present a high input impedance in both the X and Y axes inputs in order to contribute negligible current shunting of the sample 10 and the integrating capacitor 26.

Generally, ferroelectric sample will exhibit both linear and nonlinear components of resistance and capacitance. The linear resistance of the sample tends to produce a generally lossy hysteresis characteristic and the capacitance tends to affect the slope of the loop. The combined effect is shown in FIGURES 2A, D and G. In order to achieve a full understanding and analysis of the particular ferroelectric sample under analysis, it is desirable to measure the linear capacitance and resistance components of the sample. This can be accomplished by compensating the sample 10 to produce a substantially ideal characteristic as shown in FIGURE 2I.

Referring again to FIGURE 1, this measurement may be made by means of a compensation loop 38. The compensation loop 38 includes the left-hand portion of the split secondary winding 18, as shown in FIGURE 1, in series with the parallel combination of a variable capacitor 40 and a variable resistor 42. The parallel combination of resistor 42 and capacitor 40 is connected to the ground reference point 16 as shown. Accordingly a current path is defined through the series combination of integrating capacitor 26, the left-hand portion of secondary winding 18, and the parallel combination of capacitor 40 and resistor 42. While this path includes the integrating capacitor 26, it may be seen that due to the polarities of the right- and left-hand portions of the split secondary winding 18 the currents induced in the right- and left-hand circuit meshes or loops flow in opposite directions through integrating capacitor 26 and thus does not contribute an error which would affect the magnitude of the voltage $V_Y$.

It can be seen that the compensation for the linear resistance component of the ferroelectric sample by the addition of a resistance component from resistor 42 produces the effect graphically represented in FIGURE 2B. The effective subtraction of the characteristic of FIGURE 2B from the generally lossy loop of FIGURE 2A produces a lossless hysteresis loop shown in FIGURE 2C. It is to be noted however that the loop shown in FIGURE 2C nevertheless demonstrates an undesirably sloping characteristics. In FIGURE 2E the effect of compensating the ferroelectric sample 10 for the linear capacitance component is demonstrated. By effectively subtracting the characteristic produced by the variable capacitor 40 and represented in FIGURE 2E from the generally lossy and sloping characteristic shown in FIGURE 2D, the desirably saturable characteristic shown in FIGURE 2F is produced.

FIGURE 2H shows the combined effect of compensating for both the linear resistance and capacitive components of the ferroelectric sample 10. As shown in FIGURE 2I, the effects of both the linear resistance and capacitance may be compensated in order to produce an idealized hysteresis characteristic which is ideally saturable and relatively free from loss. This characteristic may be produced by manipulation of the values of the variable capacitor 40 and the variable resistor 42 in the compensation loop 38 shown in FIGURE 1. The variable elements 40 and 42 may be calibrated in order to provide an indication of the linear capacitance and resistance of the sample 10.

It is to be understood that the measurement circuit shown in FIGURE 1 is illustrative of a specific embodiment of the invention and that various modifications thereto may be made by those skilled in the art without departing from the spirit and scope of the invention. For a definition of the invention reference should be had to the appended claims.

We claim:

1. Apparatus for obtaining data defining the hystersis characteristic of a ferroelectric sample including a source of time varying current, means for connecting one side of the sample in series with the source, means for connecting the other side of the sample to ground, integrator means connected between the source and ground in series with the sample for producing a first voltage proportional to the time integral of current therethrough, a compensation loop connected across the integrator means, the loop comprising a resistor in series with means for producing time varying current flow through the loop in phase opposition to the current in the sample, and readout means having respective input circuits connected to measure the first voltage and the voltage across the sample with respect to ground and to produce a coordinated representation thereof.

2. Apparatus for obtaining data defining the hysteresis characteristic of a ferroelectric sample including a source of time varying current, means for connecting one side of the sample in series with the source, means for connecting the other side of the sample to ground, integrator means connected between the source and ground in series with the sample for producing a first voltage proportional to the time integral of current therethrough, a compensation loop connected across the integrator means, the loop comprising a capacitor in series with means for producing time varying current flow through the loop in phase opposition to the current in the sample, and readout means having respective input circuits connected to measure the first voltage and the voltage across the sample with respect to ground and to produce a coordinated representation thereof.

3. A ferroelectric hystereiscope comprising transformer means including a primary winding adapted for connection to a source of time varying current and a split secondary winding having two terminal ends and a center tap, a pair of input terminals adapted for connection across a ferroelectric sample, one of the input terminals being connected to ground and the other connected to one terminal end of the secondary winding, integrating means connected between the center tap and ground for providing an output voltage proportional to the time integral of the net current therethrough, readout means having respective input circuits for receiving the first voltage and the voltage across the ferroelectric sample and for producing a coordinated representation thereof, and a compensation circuit connected between the other terminal end of the secondary winding and ground for compensating the effect of the linear impedance components of the ferroelectric sample.

4. Apparatus as defined in claim 3 wherein the compensation circuit includes a capacitor.

5. Apparatus as defined in claim 3 wherein the compensation circuit includes a resistor.

6. Apparatus as defined in claim 3 wherein the compensation circuit includes the parallel combination of a resistor and a capacitor.

References Cited

UNITED STATES PATENTS

| | | | |
|---|---|---|---|
| 2,094,207 | 9/1937 | Eaton | 324—57 |
| 3,030,576 | 4/1962 | Van Jaarsvelt et al. | 324—57 |
| 3,299,352 | 1/1967 | Carroll | 324—57 |

FOREIGN PATENTS

| | | |
|---|---|---|
| 578,207 | 6/1946 | Great Britain. |
| 541,950 | 4/1956 | Italy. |

OTHER REFERENCES

Diamant et al.: Rev. Sci. Instrum., "Bridge for Accurate Measurement of Ferroelectric Hysteresis," vol. 28, No. 1, January 1957, pp. 30–33.

Golding: Wireless World, Transformer-Ratio Arm Bridges, January 1961, pp. 329–335.

Roetschi: J. Sci. Instr., Loop Tracer for Ferroelectrics, vol. 39, 1962 pp. 152–153.

RUDOLPH V. ROLINEC, *Primary Examiner.*

E. E. KUBASIEWICZ, *Assistant Examiner.*